Figure 1:
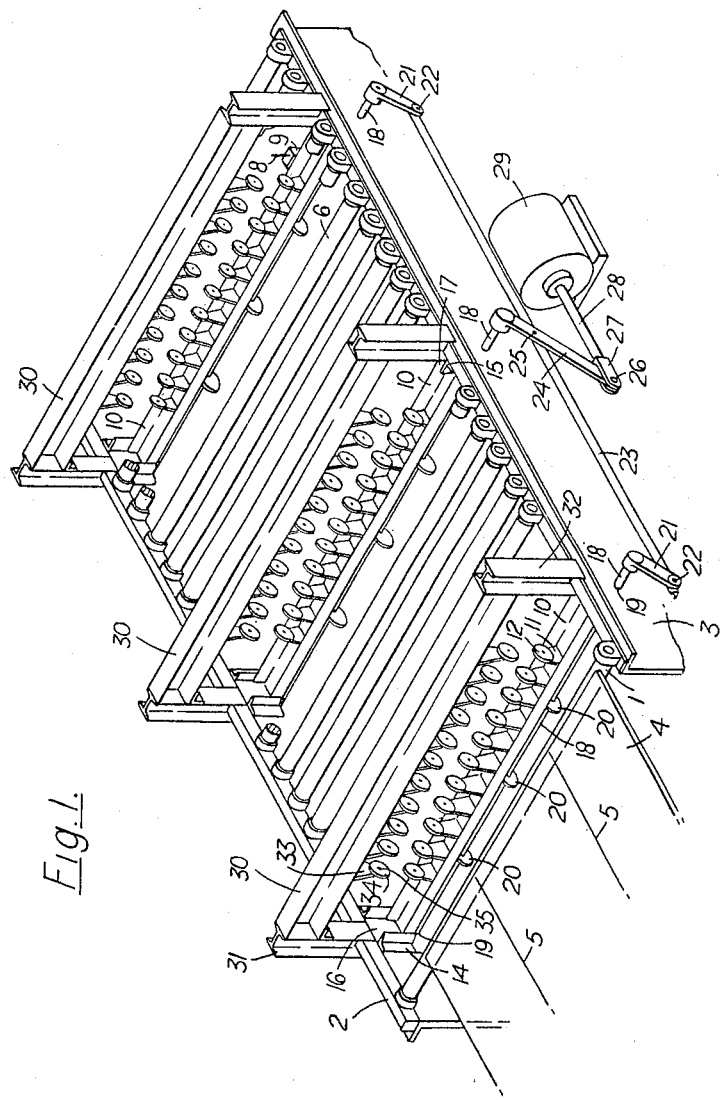

Aug. 23, 1966  R. BARRADELL-SMITH  3,268,135
SNAPPING OF SHEETS OF GLASS

Filed Nov. 13, 1964  2 Sheets-Sheet 1

Inventor
Richard Barradell-Smith
By
Morrison, Kennedy & Campbell
Attorneys

Aug. 23, 1966  R. BARRADELL-SMITH  3,268,135
SNAPPING OF SHEETS OF GLASS
Filed Nov. 13, 1964  2 Sheets-Sheet 2
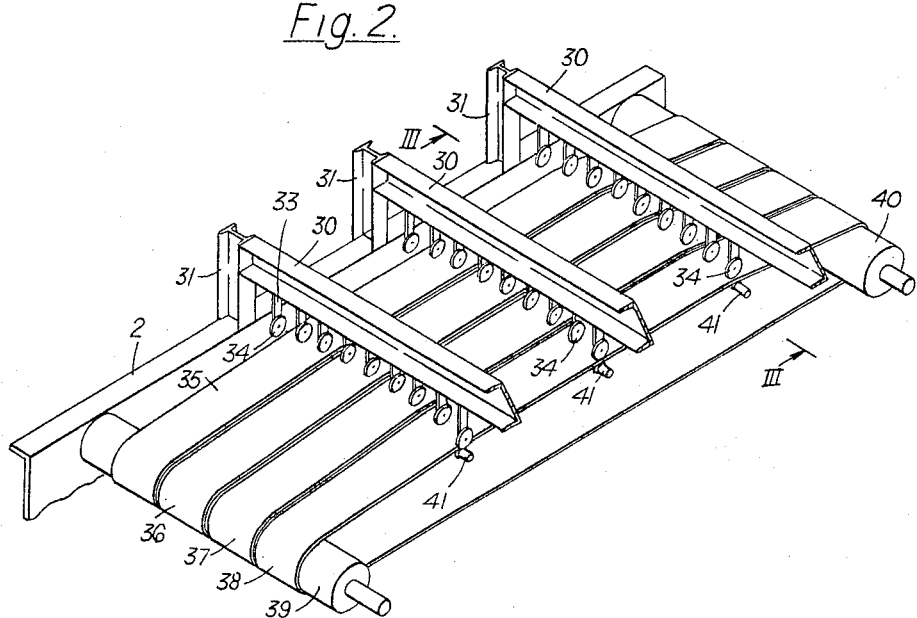
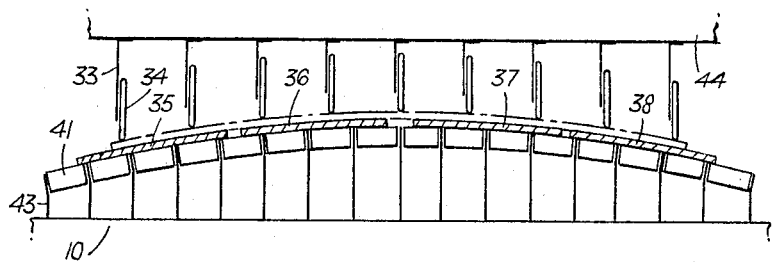
Inventor
Richard Barradell-Smith
By
Morrison, Kennedy & Campbell
Attorneys United States Patent Office 3,268,135
Patented August 23, 1966

3,268,135
SNAPPING OF SHEETS OF GLASS
Richard Barradell-Smith, St. Helens, England, assignor to Pilkington Brothers Limited, Liverpool, England, a corporation of Great Britain
Filed Nov. 13, 1964, Ser. No. 411,041
Claims priority, application Great Britain, Nov. 20, 1963, 45,876/63
12 Claims. (Cl. 225—2)

This invention relates to the snapping of sheets of glass and in particular to a method of and apparatus for snapping a sheet of glass having a score line extending along the sheet.

It is a main object of the present invention to provide a new method and apparatus for snapping glass sheets which operates to snap a sheet along any score line regardless of the position of the score line on the sheet.

According to the invention there is provided a method of snapping a sheet of glass having a score line extending along the sheet, which method is characterised by imposing a uniform curvature on the sheet, which curvature is sufficient to snap the sheet along any score line parallel to the axis of curvature but is insufficient to break any unscored area of the sheet.

In a continuous process according to the invention for the manufacture of flat glass, sheets of glass are cut from a ribbon of glass and the sheets are then conveyed one after each other on a horizontal conveyor. A score line or score lines is/or are scored lengthwise on the sheet of glass, that is in the direction of movement of the sheets on the conveyor and the sheet is so bent as to impose the above-mentioned curvature on the sheet.

In a preferred method according to the invention a cylindrical form is imposed on the sheet, the generatrix of which cylinder extends parallel to the score line.

The sheet of glass may be stationary as it is snapped, but preferably the invention is characterised by advancing the sheet of glass in a direction parallel to said score line, and imposing the curvature on the sheet as the sheet is advanced.

A score line or score lines may be marked on the sheet of glass as it is advanced towards the snapping apparatus, and the invention also includes a method of snapping a sheet of glass, comprising advancing a sheet of glass, scoring the sheet as it is advanced with a score line extending parallel to the direction of advance of the sheet, and imposing a uniform curvature on the scored sheet as it is advanced, which curvature is sufficient to snap the sheet along any score line parallel to the axis of curvature but is insufficient to break any unscored area of the sheet.

Further the invention comprehends apparatus for snapping a sheet of glass along a score line extending along the sheet, comprising means for supporting the sheet, and means for bending the supported sheet to a uniform curvature whose axis is parallel to the score line, which curvature is such that the glass snaps along the score line without any unscored area of the sheet being broken.

One embodiment of apparatus according to the invention comprises a lower frame or convex cylindrical form, a complimentary overhead frame or cylindrical form operatively associated with the convex lower frame to impose the desired cylindrical form on the glass, and actuating means operable to raise the lower frame thereby to press a scored sheet, supported between the frames, against the overhead frame so that the sheet is bent to the required cylindrical form and snaps along any score line.

Further according to the invention the lower frame includes a number of horizontal bars integrally mounted in the frame and each carrying a plurality of rollers so mounted that the upper surface of the rollers lie on a convex arc of a circle, and the overhead frame comprises a plurality of overhead beams from each of which depends a series of rollers arranged so that their lower surfaces lie on a concave arc of a circle matching the convex arc of the lower frame rollers.

Horizontal conveying rollers may be mounted between the horizontal bars of the lower frame so that a sheet of glass is initially supported on the conveying rollers as it is lifted off the conveying rollers as the horizontal bars are raised by operation of the actuating means.

The supporting means may comprise, according to the invention, a flexible conveyor belt arranged between the frames, whereby a scored sheet on the conveyor belt is pressed between the frames upon operation of said actuating means for the lower frame as the sheet is advanced between the frames.

Although the conveyor belt may be in one piece, desirably the conveyor comprises multiple belts lying side-by-side.

Further according to the invention, in order to assist the separation of the snapped pieces of glass, the rollers on the overhead frame may be skewed outwardly.

In order that the invention may be more clearly understood some embodiments thereof will now be described, by way of example, with reference to the accompanying drawings, in which:

FIGURE 1 is a perspective view of one embodiment of apparatus according to the invention in which a sheet of glass is snapped along score lines on the sheet as the sheet is conveyed through the apparatus, FIGURE 2 is a perspective view similar to FIGURE 1 of a second embodiment of apparatus according to the invention, and FIGURE 3 is a section on line III—III of FIGURE 2.

In the drawings the same references designate the same parts.

Referring to FIGURE 1 of the drawings, sheets of glass are being handled on a conveyor, being conveyed towards apparatus according to the invention on conveyor rollers 1 which are mounted between side beams 2 and 3. Each sheet of glass, one being indicated at 4 in FIGURE 1, has one or more score lines extending along the sheet parallel to the direction of movement of the sheet of glass along the conveyor.

By the method of the invention a uniform curvature is imposed on the sheet of glass, the axis of which curvature is parallel to the score lines, which curvature is sufficient to snap the sheet along the score line or lines, but is insufficient to break any unscored area of the sheet.

The sheet of glass 4 has longitudinally extending score lines 5 on the upper surface of the sheet, as indicated in FIGURE 1.

As the sheet of glass 4 enters the snapping apparatus it passes between a lower frame of convex form and a complementary overhead frame of concave form operatively associated with the convex lower frame to impose the desired curvature of cylindrical form on the glass. The sheet 4 is advanced between these frames on conveyor rollers 6 mounted between the side beams 2 and 3, and when the leading edge 7 of the sheet of glass has passed right through the lower and overhead frames it engages a feeler 8 whose movement by the sheet edge 7 trips sensing means 9 which operates actuating means for the lower frame, whose operation will be described below.

The lower frame comprises a plurality of horizontal bars 10, each of U-section. Each of the bars 10 has mounted on it a number of brackets 11 of graduated height increasing to the centre of the bar from each end of the bar. Each bracket 11 carries a roller 12 mounted on a pivot 13 on the upper end of the bracket, and the heights of the brackets are so graduated that the upper surfaces of the rollers 12 lie on an arc of a circle. The rollers 12 on each of the horizontal bars 11 are mounted on graduated brackets of the same form so that the upper surfaces of the rollers mounted on the horizontal bars 10 all lie on a cylindrical surface.

Each of the horizontal bars is mounted between the side beams 2 and 3 by each end of each bar being supported in a bracket fixed to one of the side beams. The brackets, respectively 14 and 15, which are fixed to the inner surfaces of the side beams 2 and 3 each define a vertical channel, 16 and 17 respectively, for guiding the ends of the bars 10. The bars 10 are shown in their lowest position in FIGURE 1 in which the ends of the bars 10 rest in the bottom of the vertical channels 16 and 17 in the brackets 14 and 15.

Under each of the bars 10 there is mounted an axle 18. Each axle 18 passes through bearing holes 19 in the side beams 2 and 3 and each axle carries a number of cams 20 on which the undersurface of the appropriate bar 10 rests.

In the embodiment illustrated in FIGURE 1 the lower frame comprises three horizontal bars 10 which are between 1 and 3 feet apart.

The axles 18 mounted under the two outer bars 10 carry arms 21 on their outer ends. The upper ends of these arms 21 are fixed to the ends of the axles 18 and the lower ends of the arms 21 carry pivots 22 to provide for pivotal connection to the ends of a connecting rod 23 extending along the outside of the side beam 3. The axle 18 under the central bar 10 has a longer arm 24 fixed to its outer end. This arm 24 is pivoted at 25 to the rod 23 and at its other end the arm 24 is pivotally connected as indicated at 26 to a fork 27 carried on one end of a piston rod 28. The piston rod 28 is connected to a piston, not shown, which moves in an hydraulically operated cylinder 29 which is pivotally mounted in trunnions, not shown, in known manner. When the cylinder is operated so that the piston rod 28 is drawn into the cylinder the axles 16 rotate to cause the cams 20 to raise the horizontal bars in their channels 16 and 17 so that the sheet of glass is lifted off the conveying rollers 6 by the lower frame rollers 12 and raised into engagement with the overhead frame. The inertia of the sheet of glass causes it to continue to advance as it is lifted.

The overhead frame comprises a plurality of overhead beams 30, there being three beams 30 in the apparatus of FIGURE 1 each mounted over one of the lower frame bars 10. The beams 30 are mounted on support struts 31 and 32 respectively fixed to the upper surfaces of the side beams 2 and 3. Each overhead beam 30 carries a plurality of brackets 33 fixed to and depending from the underface of the beam 30, and each bracket 33 carries a roller 34 mounted on a pivot 35 fixed to the lower end of the bracket 33. The brackets 33 are of graduated height decreasing to the centre of the beam 30 from each end so that the lower surfaces of the rollers 34 lie on a concave arc of a circle having the same radius as the convex arc on which the upper surfaces of the lower rollers 12 lie. When the cylinder 29 is operated to raise the sheet of glass 4 on the lower rollers 12 the margins of the sheet first engage the outer rollers 34 as the sheet is raised, and as the lifting of the sheet continues the sheet is bent across its width to the uniform cylindrical form defined by the form of the sets of upper and lower rollers, the generatrix of which cylinder extends parallel to the score line or lines. The curvature imposed on the bent sheet is such that the glass snaps along the score lines 5, but the curvature is insufficient to break any unscored area of the sheet.

After the sheet has been snapped the cylinder 29 is again operated to lower the bars 10 to their lowermost position so that the snapped pieces of glass rest on the conveyor rollers 6 which then convey the pieces of glass out of the apparatus as the next sheet to be snapped is conveyed into the apparatus between the upper and lower frames.

All the overhead rollers 34 are slightly skewed outwardly to assist the separation of the snapped pieces of glass from each other as they are advanced so that the cut edges of the glass do not damage each other.

The apparatus of FIGURE 1 may be modified by incorporating the three horizontal bars 10 in an integral frame which is lifted by bell cranks at the four corners of the frame. Atlernatively two cranks may be located on the centre line of the frame, and associated anti-roll bars used to maintain the frame horizontal as it rises.

A second embodiment of apparatus according to the invention is illustrated in FIGURES 2 and 3, this being a further modification of the apparatus in FIGURE 1.

In this modified apparatus the scored sheet of glass 4 passes from the conveyor rollers 1 on to a flexible conveyor consisting of multiple belts 35, 36, 37 and 38 which extend around two main belt rollers 39 and 40 which are mounted between the side beams 2 and 3.

The upper stretches of the belts are normally flat, but when the lower frame is raised to the position shown in FIGURE 2, the upper stretch of the conveyor is supported by belt support rollers mounted on the lower frame and between the main belt rollers 39 and 40. There are three sets of belt support rollers 41 in the apparatus illustrated in FIGURE 2.

Each set of belt support rollers 41 is arranged on an identical curve to cause the upper stretch of the conveyor to assume a cylindrical form whose axis is parallel to the direction of movement of the glass sheet through the apparatus. The set of belt rollers at the discharge end of the apparatus is illustrated in FIGURE 3 and comprises rollers 41 each supported from one of the cross beams 10 of the lower frame on mountings 43 and so arranged that the rollers 41 lie on an arc which is at right angles to the direction of advance of the sheet.

Co-operating with each set of belt support rollers there is an overhead beam, as in the FIGURE 1 embodiment. Three beams 30 are illustrated in FIGURE 2 and each beam is mounted on support struts 31 fixed to the side beams 2 and 3 so that the beams extend across the conveyor belt over the sets of belt support rollers. Each beam 30 carries on its underface a plurality of rollers 34 mounted on brackets 33 in the same manner as illustrated in FIGURE 1, so that the undersurfaces of the rollers 34 lie on a cylindrical surface which matches the cylindrical surface of the conveyor belt.

The lower frame engages the conveyor belt when the frame is raised, and the sheet of glass continues to advance through the apparatus on the conveyor belt as the desired cylindrical form is imposed on it by bending between the frames.

The overhead rollers 34 are skewed outwardly at a small angle, as described above, which assists separation of the snapped pieces of glass on the belt so that they are conveyed away without damaging each other.

After the snapping has taken place the snapped pieces of glass are conveyed off the discharge end of the apparatus on to further rollers of the conveyor, not shown.

There is thus provided according to the invention a novel method of snapping score lines on a sheet of glass which is being handled on a conveyor where the score lines extend in the direction of movement of the sheet of glass on the conveyor. Because a uniform curvature is imposed on the whole of the sheet across the width of the sheet, any longitudinal score line or lines on the sheet snap regardless of their position on the sheet, while the unscored areas of the sheet are unbroken. Consequently there is no call for any resetting or repositioning of pressure devices when the position of score lines on the sheets of glass on the conveyor is altered.

The invention also comprehends pieces of flat glass cut from sheets of glass by the method of the invention.

I claim:
1. A method of snapping a sheet of glass having a score line extending along the sheet, characterised by simultaneously imposing a transverse curvature on the whole length of the sheet, which curvature is sufficient to snap the sheet along any score line parallel to the axis of the curvature but is insufficient to break any unscored area of the sheet.

2. A method according to claim 1, characterised by imposing a cylindrical form on the sheet, the generatrix of which cylinder extends parallel to the score line.

3. A method of snapping a sheet of glass, comprising advancing a sheet of glass, scoring the sheet as it is advanced with a score line extending parallel to the direction of advance of the sheet, and simultaneously imposing a uniform transverse curvature on the whole length of the scored sheet as it is advanced, which curvature is sufficient to snap the sheet along any score line parallel to the axis of the curvature but is insufficient to break any unscored area of the sheet.

4. Apparatus for snapping a sheet of glass along a score line extending along the sheet, comprising means for supporting the sheet, and means for simultaneously bending the whole length of the supported sheet to a transverse curvature whose axis is parallel to the score line, which curvature is such that the glass snaps along the score line without any unscored area of the sheet being broken.

5. Apparatus according to claim 4, comprising a lower frame of convex cylindrical form, a complementary overhead frame of cylindrical form operatively associated with the convex lower frame to impose the desired cylindrical form on the glass, and actuating means operable to raise the lower frame thereby to press a scored sheet, supported between the frames, against the overhead frame so that the sheet is bent to the required cylindrical form and snaps along any score line.

6. Apparatus according to claim 5, wherein the lower frame includes a number of horizontal bars integrally mounted in the frame and each carrying a plurality of rollers, all the rollers of the lower frame being so mounted that the upper surfaces of the rollers lie on a convex cylindrical surface, and the overhead frame comprises a plurality of overhead beams from each of which depends a series of rollers, all the rollers of the upper frame being arranged so that their lower surfaces lie on a concave cylindrical surface matching the convex surface defined by the upper surfaces of the lower frame rollers.

7. Apparatus according to claim 6, wherein the supporting means comprises a flexible conveyor belt arranged between the frames, whereby a scored sheet on the conveyor belt is pressed between the frames upon operation of said actuating means for the lower frame as the sheet is advanced between the frames.

8. Apparatus according to claim 6, wherein the rollers on the overhead frame are skewed outwardly to assist separation of the snapped pieces of glass.

9. A method of snapping a sheet of glass having a score line extending along the sheet, comprising advancing the sheet of glass in a direction parallel to said score line and simultaneously imposing a transverse curvature on the whole length of the sheet as the sheet is advanced, which curvature is sufficient to snap the sheet along any score line parallel to the axis of the curvature but is insufficient to break any unscored area of the sheet.

10. A method of snapping a sheet of glass having a plurality of transversely spaced score lines extending along the sheet, characterised by simultaneously imposing a transverse curvature on the whole length of the sheet, which curvature is sufficient to snap the sheet along the score lines but is insufficient to break any unscored area of the sheet.

11. Apparatus for snapping a sheet of glass along a score line extending along the sheet, comprising a lower frame including a number of horizontal bars integrally mounted in the frame, a plurality of lower rollers carried by each bar which rollers are so mounted on the bars that the upper surfaces of the lower rollers lie on a convex cylindrical surface, horizontal conveying rollers mounted between the horizontal bars of the lower frame so that a sheet of glass is initially supported on the conveying rollers, an upper frame mounted above and complementary to the lower frame, which upper frame includes a plurality of overhead beams, a plurality of series of upper rollers respectively depending from the overhead beams, all the upper rollers being so arranged that their lower surfaces lie on a concave cylindrical surface matching the convex surface defined by the upper surface of the lower rollers and actuating means operable to raise the lower frame thereby to lift a scored sheet off the conveying rollers and to press the scored sheet, supported between the frames, against the upper frame so that the sheet is bent to the required cylindrical form and snaps along any score line.

12. Apparatus according to claim 11, wherein the upper rollers are skewed outwardly to assist the separation of snapped pieces of glass.

References Cited by the Examiner
UNITED STATES PATENTS

| | | | |
|---|---|---|---|
| 2,311,995 | 2/1943 | Parker | 225—98 |
| 2,504,655 | 4/1950 | Dallas | 225—2 |
| 2,693,053 | 11/1954 | Eakin | 225—96.5 |
| 2,756,545 | 7/1956 | Atkeson | 225—2 |
| 3,044,216 | 7/1962 | Billinger | 225—96.5 |
| 3,175,745 | 3/1965 | Inslio | 225—2 X |
| 3,194,464 | 7/1965 | Aksnes et al. | 225—96 |

FOREIGN PATENTS

| | | |
|---|---|---|
| 1,290,194 | 3/1962 | France. |
| 1,016,417 | 9/1957 | Germany. |

WILLIAM W. DYER, JR., *Primary Examiner.*

J. M. MEISTER, *Assistant Examiner.*